No. 770,116. PATENTED SEPT. 13, 1904.
C. F. ROPER.
HARNESS MOTION FOR LOOMS.
APPLICATION FILED SEPT. 14, 1903.
NO MODEL. 4 SHEETS—SHEET 1.
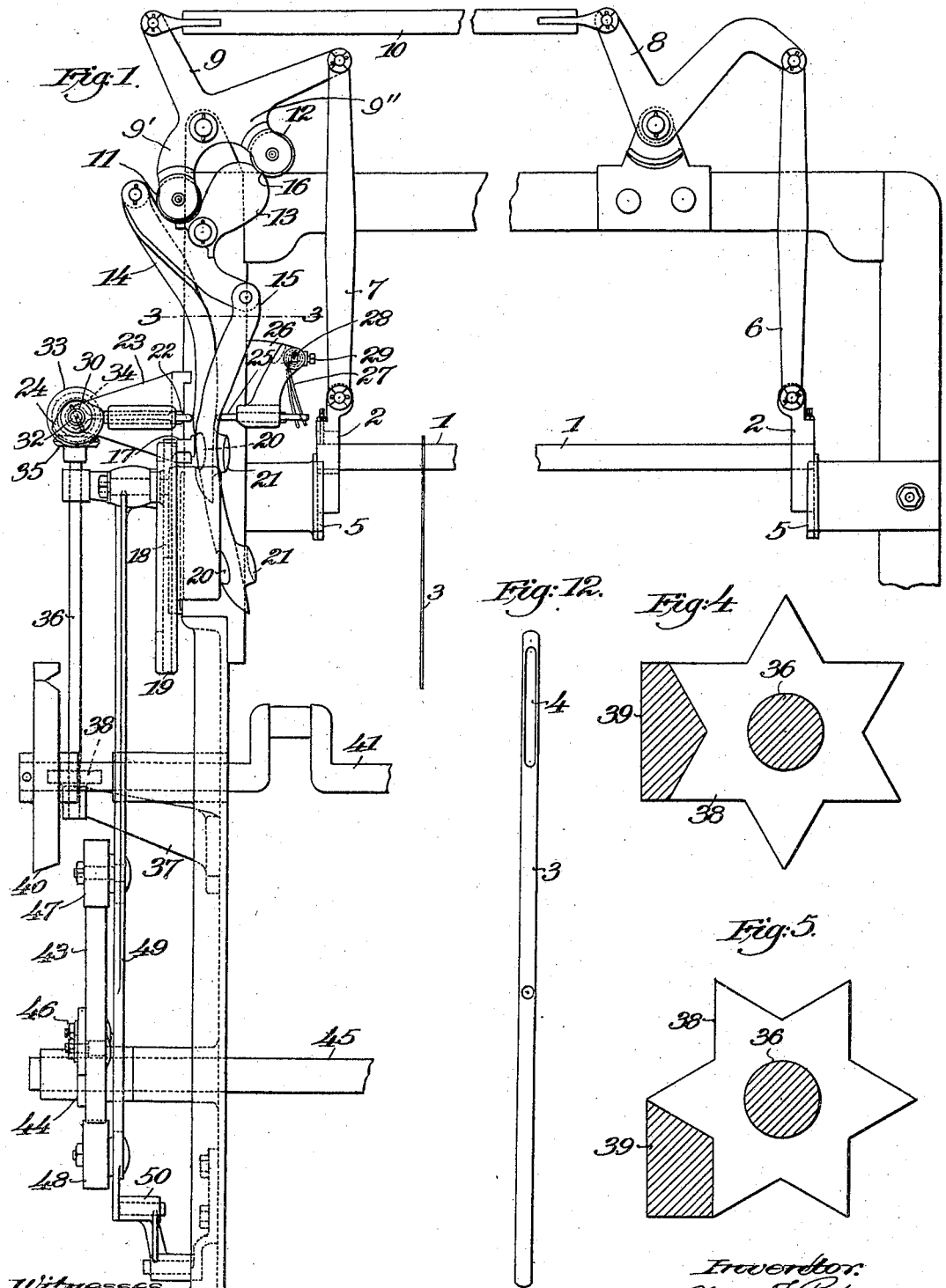

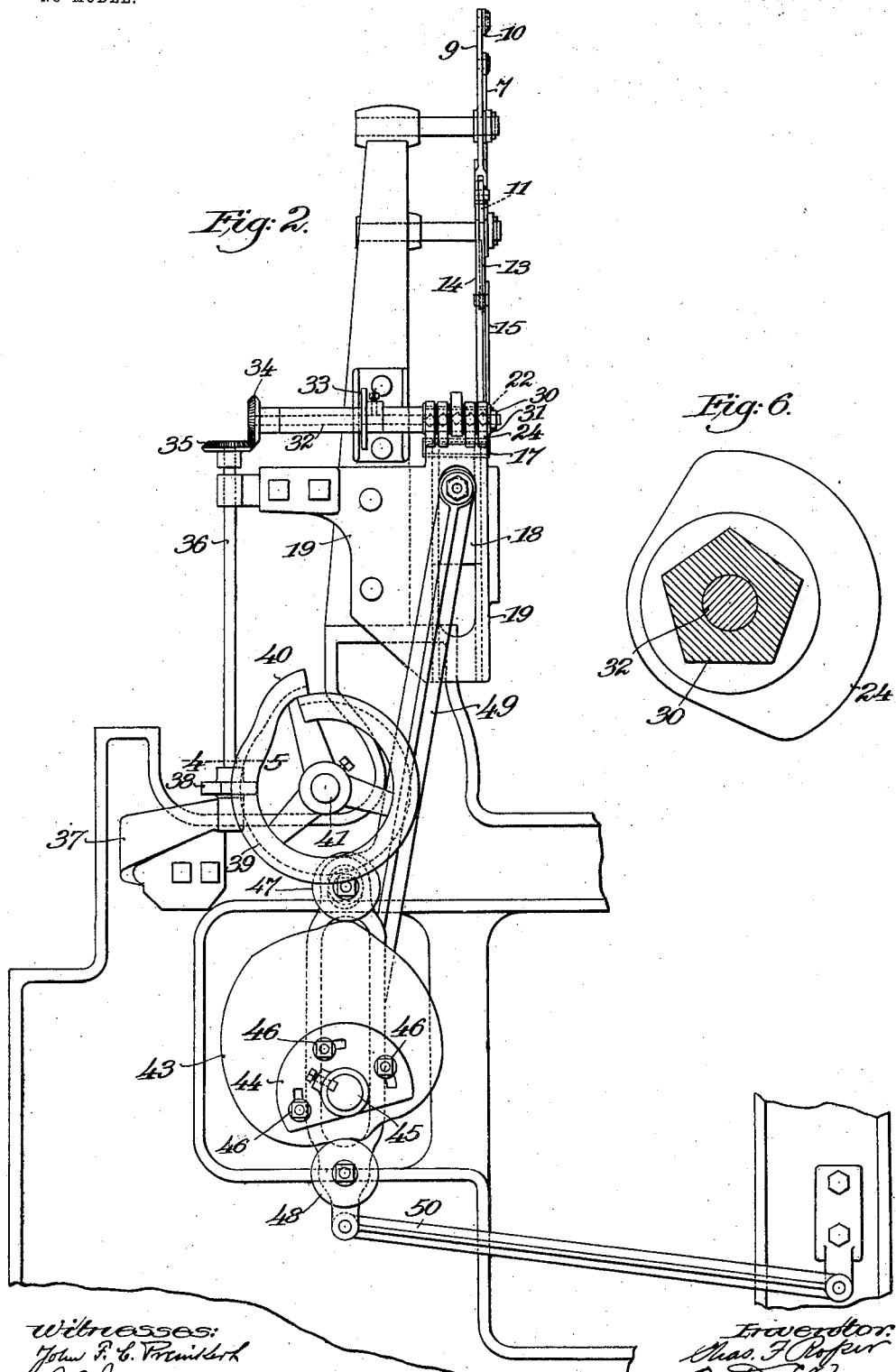

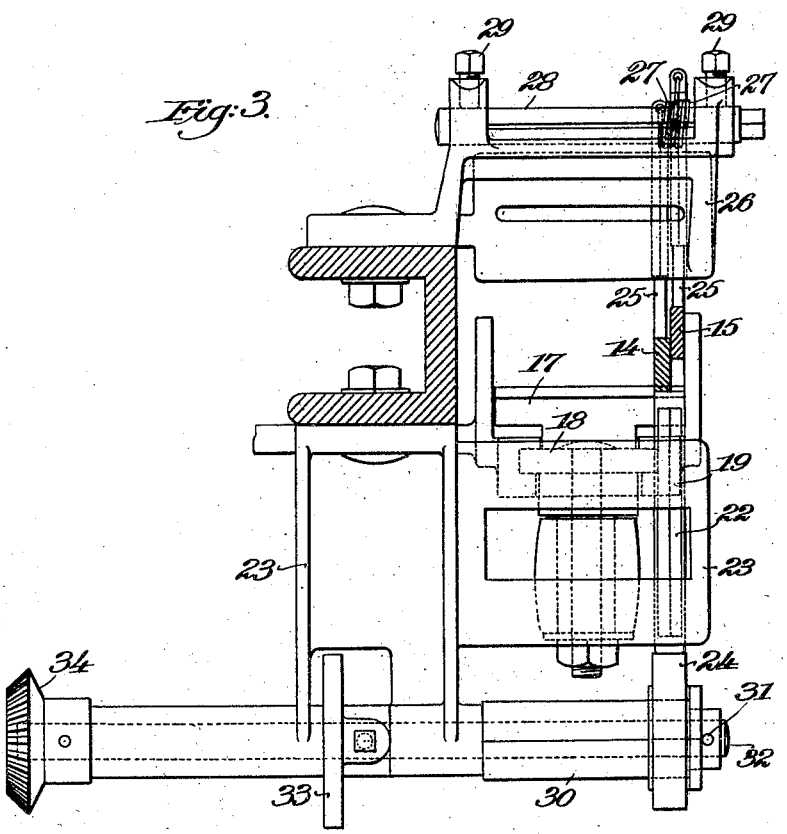

No. 770,116. PATENTED SEPT. 13, 1904.
C. F. ROPER.
HARNESS MOTION FOR LOOMS.
APPLICATION FILED SEPT. 14, 1903.
NO MODEL. 4 SHEETS—SHEET 4.
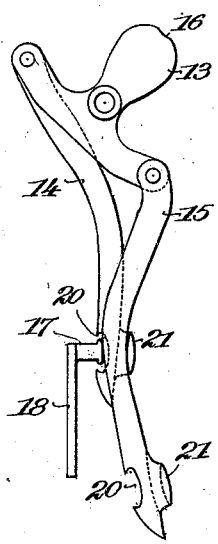
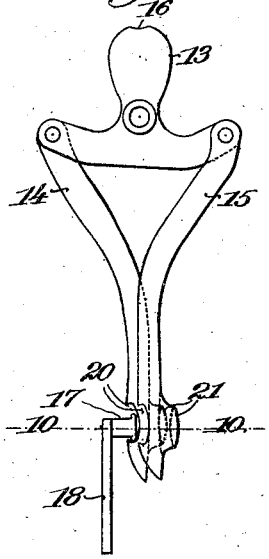
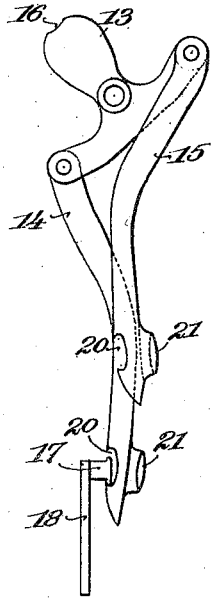
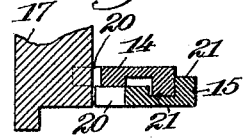
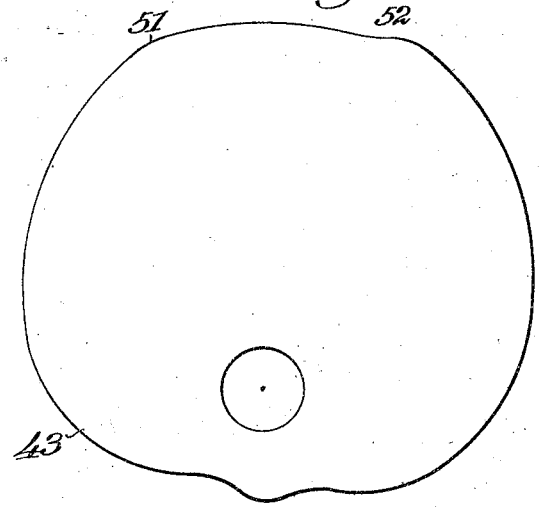

No. 770,116. Patented September 13, 1904.

UNITED STATES PATENT OFFICE.

CHARLES F. ROPER, OF HOPEDALE, MASSACHUSETTS, ASSIGNOR TO DRAPER COMPANY, OF HOPEDALE, MASSACHUSETTS, A CORPORATION OF MAINE.

HARNESS-MOTION FOR LOOMS.

SPECIFICATION forming part of Letters Patent No. 770,116, dated September 13, 1904.

Application filed September 14, 1903. Serial No. 173,039. (No model.)

*To all whom it may concern:*

Be it known that I, CHARLES F. ROPER, a citizen of the United States, residing at Hopedale, in the State of Massachusetts, have invented certain new and useful Improvements in Harness-Motions for Looms; and I do hereby declare the following to be a full, clear, and exact description of the invention, such as will enable others skilled in the art to which it appertains to make and use the same.

The present invention relates to harness-motions for looms.

The object of the present invention is to provide a harness-motion which is especially applicable to looms employing more than two harnesses, although some of the features are applicable to looms having but two harnesses.

The objects of the invention are to positively actuate the heddle-frames in both directions without the employment of any strap connections, to actuate the heddle-frames by a side cam and side connections connecting with the heddle-frames from above only, thereby leaving the space within the side frames of the loom beneath the heddle-frames wholly unobstructed by harness-actuating mechanism, thus rendering the harness-actuating mechanism more readily accessible and leaving greater space for the warp-roll, the cloth, and other mechanism of the loom, and in case more than two harnesses are employed to provide selecting mechanism to control the movements of the heddle-frames in such manner that a heddle-frame can be left in an elevated or depressed position for any desired period and can then be moved as required, the heddle-frame being held or locked, especially in its elevated position, when disconnected from its actuating mechanism. In connection with the improved mechanism for carrying out these objects the selecting devices are conveniently constructed and arranged so that the timing of the harness can be readily changed and the number of harnesses can be increased or diminished within the capacity of the loom with readiness and facility.

In carrying out the objects of invention above referred to I have provided a harness-motion which is simple and compact in construction and which is arranged to actuate the heddle-frames in a simple, direct, and positive manner and with a much less expenditure of power than has heretofore been required.

This harness-motion in addition to accomplishing the objects above referred to also embodies certain novel features of construction hereinafter described and claimed, the advantages of which will be obvious to those skilled in the art.

The various features of my invention will be clearly understood from the following description, taken in connection with the accompanying drawings, in which is illustrated a harness-motion for looms embodying the same in the best form at present known to me.

Referring to the drawings, Figure 1 is a view in front elevation of a harness-motion embodying the various features of my invention in their preferred form, so much only of the loom being illustrated as is necessary to show the connection of my invention therewith. Fig. 2 is a view in side elevation of the mechanism illustrated in Fig. 1 looking from the left of the figure. Fig. 3 is a detail plan view on the line 3 3 of Fig. 1. Figs. 4 and 5 are detail sectional views taken on the line 4 5 of Fig. 2, the two views showing the cam 39 and wheel 38 turned to different positions, and hence showing different configurations of the cam 39. Fig. 6 is a detail view of one of the selector-cams, the sleeve and shaft upon which the cam is mounted being shown in cross-section. Fig. 7 is a detail view of a cam-lever, the two coupler-bars connected therewith, and the reciprocating actuator, the parts being shown in the positions which they assume during the dwell of the actuator near the limit of its upward movement and one of the coupler-bars being in a position to be engaged by the actuator during its downward movement. Fig. 8 is a view similar to Fig. 7, showing the positions which the parts assume when the actuator is at the middle of its downward movement, one of the coupler-bars being engaged by the actuator and the other coupler-bar being held out of engagement therewith by the coöperating projections on the coupler-bars. Fig. 9 is a view similar to Figs. 7 and 8, showing the positions which the parts assume when the actuator is at the limit of its downward movement. Fig. 10 is a detail sectional view taken on the line 10 10 of Fig. 8, illustrating the manner in which the projections on the coupler-bars coöperate to hold one bar out of engagement with the actuator while the other is in engagement therewith. Fig. 11 is a face view of the harness-cam from which the reciprocating movements are imparted to the actuator, and Fig. 12 is a view of one of the metallic heddles carried by the heddle-frame.

For the sake of clearness I have illustrated but one heddle-frame in the drawings and the connections between the heddle-frame and the actuator, it being understood that any desired number of heddle-frames may be employed. The heddle-frame illustrated consists of a cross-bar 1 and two end bars 2 2, the frame being adapted to support a series of metallic heddles 3 of well-known construction. One of these heddles is illustrated separately in Fig. 12, and also one of the heddles is illustrated in Fig. 1 supported upon the cross-bar 1, the cross-bar passing through the elongated slot 4 in the upper end of the heddle.

The end bars 2 2 of the heddle-frame are received and guided in vertical guideways 5, formed in brackets secured to the side frames of the loom, so that the heddle-frame is guided at both ends during its vertical reciprocating movements and can be actuated evenly and smoothly. The upper ends of the bars 2 of the heddle-frame are connected, by means of links 6 and 7, to bent levers 8 and 9, pivotally mounted upon the upper portion of the loom-frame. The bent levers 8 and 9 are connected by means of a link 10, the construction and arrangement of the levers and links being such that when the lever 9 is oscillated in opposite directions the heddle-frame is raised and lowered. The bent lever 9 is provided with arms 9' 9", extending on opposite sides of its pivot, in which are mounted rolls 11 and 12. These rolls are engaged by the cam-surface of a cam-lever 13, pivotally mounted upon the loom-frame below the bent lever 9. The cam-lever 13 is provided with arms extending on opposite sides of its pivot, and pivotally connected to the outer ends of these arms are coupler-bars 14 and 15, which extend downwardly into a position to engage the actuator. The cam-lever is oscillated from the actuator through one or the other of these coupler-bars, the coupler-bar which is engaged by the actuator moving in one direction and the other coupler-bar moving in the opposite direction. The coupler-bars are connected to and disconnected from the actuator, as will be hereinafter described, when the heddle-frame is either in its raised or in its lowered position, and in order to lock the heddle-frame securely in either of these positions when the coupler-bars are disconnected from the actuator the cam-surface of the cam-lever 13 is provided with a locking-rest 16, which when the heddle-frame is in its raised position engages the roll 12 and when the heddle-frame is in its lowered position engages the roll 11, thereby holding or locking the heddle-frame when elevated against the action of gravity and also holding or locking the heddle-frame when depressed, as well as when elevated, so as to prevent any overrunning due to momentum, whereby the heddle-frame is held in a definite position. This construction and mode of operation will be clearly understood from inspection of Figs. 1, 7, 8, and 9. It will be understood that the other heddle-frames and the connections between the heddle-frames and the actuator are similar to the heddle-frame and connections illustrated in the drawings and above described, all of the coupler-bars extending into a position to be engaged by the same actuator. It is desirable that the heddle-frames which are more remote from the fell of the cloth should have a greater throw, as is well understood by those skilled in the art, and this may readily be accomplished, as will be evident, by increasing the length of the cam portions of the cam-levers.

The actuator is indicated at 17 and, as illustrated, consists of a horizontal bar upon the upper end of a slide 18, mounted in vertical guideways in a bracket 19, secured to one of the side frames of the loom. The slide 18 is reciprocated, as will be hereinafter described, from a cam on the cam-shaft of the loom, a complete reciprocation being imparted to the slide during each revolution of the cam-shaft, so that the actuator 17 is moved in one direction for one pick of the loom and is moved in the opposite direction for the next pick, the actuator making a movement in one direction or the other during each revolution of the crank-shaft which actuates the lay. In order to enable the coupler-bars to be engaged by the actuator, each coupler-bar is provided near its lower end with an undercut notch 20, so shaped that when the notch is in engagement with the actuator the coupler-bar is moved with the actuator during its movement in either direction. To avoid any possibility of a coupler-bar being disengaged from the actuator during its movements, the notches are undercut both at their upper and lower edges—that is to say, each notch has a contracted mouth—and the portion of the actuator which engages the notches is correspondingly shaped. The coupler-bars are moved into and out of engagement with the actuator when it is near the limit of either its upward or its downward movement, and it will be apparent from inspection of Figs. 1, 7, 8, and 9 that when one of the coupler-bars is in a position to engage the actuator near the limit of its upward movement the other coupler-bar is in a position to engage the actuator near the limit of its downward movement. One of the coupler-bars can thus be engaged by the actuator near either its upward or its downward limit of movement, and the heddle-frame connected to the coupler-bars can be either raised or lowered during the movement of the actuator in either direction. The actuator after reaching the limit of its upward or downward movement is moved a short distance in the opposite direction to free it from operative contact with the coupler-bar and is then caused to dwell for a sufficient length of time to enable a coupler-bar to be moved into or out of engagement therewith. The position which the actuator assumes near the limit of its upward movement in order to allow a coupler-bar to be moved into or out of engagement therewith is illustrated in Fig. 7, in which it will be seen that the actuator is midway between the upper and lower edges of the notch in the coupler-bar 14. It is at these times that the heddle-frame is held or locked by the locking-rest 16, thus insuring definite positions for the heddle-frame during the dwells of the actuator. Both coupler-bars 14 and 15 are held out of engagement with the actuator by means of a single cam-actuated follower, as will be hereinafter described, and in order to prevent one coupler-bar from engaging with the actuator while the other bar is in engagement therewith the bars are provided with projections 21 back of the notches 20, which extend toward each other. During the reciprocation of the actuator these projections engage, as is illustrated in Figs. 8 and 10, so that the coupler-bar which has not been moved into engagement with the actuator is held out of engagement therewith while its notch is passing by the actuator.

The follower above referred to, which holds the coupler-bars 14 and 15 out of engagement with the actuator, is indicated at 22 (see Figs. 1 and 3) and consists of a rod mounted to slide in horizontal guideways in a bracket 23, secured to one of the side frames of the loom. One end of the follower is arranged to bear against both of the coupler-bars 14 and 15, and the other end bears against a selector-cam 24. As many followers and selector-cams are provided as there are heddle-frames. The coupler-bars are moved into engagement with the actuator by means of spring-actuated followers 25, a spring-actuated follower being provided for each coupler-bar. These followers are mounted to slide in horizontal guideways in a bracket 26, secured to the inner side of the loom-frame. Each follower bears at one end against a coupler-bar and at its other end is engaged by a spring 27. The springs 27 are coiled around a rod 28, secured in bearings in the bracket 26 by means of binding-screws 29, and one end of each spring is inserted in a longitudinal slot in the rod 28, so that by rotating the rod 28 in its bearings and securing it in position by the screws 29 the tension of the springs 27 can be adjusted as desired.

The selector-cams 24 are slidingly mounted upon a sleeve 30, which is removably secured by a pin 31 to a shaft 32, mounted in bearings in the bracket 23. The sleeve 30 is equilateral in cross-section, as indicated in Fig. 6, and the cams 24 are provided with correspondingly-shaped equilateral openings through which the sleeve passes. By this construction the cams can be placed in any desired angular position with relation to each other on the sleeve 30, it being merely necessary in order to adjust a cam to remove it from the sleeve by sliding it off and then replace it thereon after it has been rotated to the desired position. When the sleeve 30 is provided with five sides, as illustrated in Fig. 6, it will be evident that the cam can be placed on the sleeve in any one of five angular positions. The sleeve 30 can be removed when desired and a sleeve having a different number of sides substituted therefor corresponding to the number of harnesses. The shaft 32 is rotated through a portion of a revolution each time the actuator 17 dwells near the limit of its movement in each direction, as will be described, so that during the dwells of the actuator the selector-cams are actuated to cause the coupler-bars to be connected to or disconnected from the actuator. The number of movements imparted to the shaft 32 to complete its revolution is equal to the number of sides on the sleeve 30, in the construction illustrated in the drawings five step-by-step movements being imparted to the shaft. When the sleeve is in place on the shaft, it constitutes a part of the shaft and a rotary support for the selector-cams which is equilateral in cross-section.

It will be noted that but a single selector-cam is required for acting upon the connections to a heddle-frame and that this cam is of very simple construction, as it merely holds the coupler-bars out of engagement with the actuator or allows the coupler-bars to move into engagement with the actuator. The selector-cams may be of any desired shape and arranged in any desired manner, so as to cause the heddle-frames to be actuated in any predetermined order. The selector-cam illustrated in Figs. 1 and 6 is shaped and arranged to hold the coupler-bars 14 and 15 out of engagement with the actuator during three picks of the loom, the heddle-frame being in its raised position, and to allow one of the coupler-bars to be engaged by the actuator during the next two picks of the loom, one pick taking place while the heddle-frame is in its lowered position and the other pick taking place while the heddle-frame is in its raised position.

The shaft 32, upon which the selector-cams are mounted, is held from longitudinal movement by means of a collar 33, which is secured to the shaft between its two bearings. Upon the end of the shaft opposite to that upon which the selector-cams are mounted a bevel-gear 34 is secured, which meshes with a bevel-gear 35, secured upon the upper end of a vertical shaft 36, journaled in a bracket secured to the bracket 19 and in a bracket 37, secured to the loom-frame. Upon the lower end of the shaft 36 above the bracket 37 is secured a six-pointed star-wheel 38, with which a cam-rib 39, formed upon the rim of a wheel 40, engages, as is clearly shown in Figs. 4 and 5. The wheel 40 is secured to one end of the crank-shaft 41, from which the lay is actuated, and the cam-rib 39 is so shaped that during each revolution of the crank-shaft the star-wheel 38 is rotated through one-sixth of a revolution, the movement of the star-wheel taking place during the dwell of the actuator near the limit of either its upward or downward movement. The proportion between the bevel-gears 34 and 35 is such that for each actuation of the star-wheel 38 and shaft 36 the shaft 32, upon which the selector-cams are mounted, is rotated through one-fifth of a revolution. When a sleeve having a different number of sides is substituted for the sleeve 30, (illustrated in the drawings,) the bevel-gears 34 and 35 are replaced by gears proportioned to give the desired extent of movement to the shaft 32. The cam-rib 39 is constantly in engagement with the star-wheel, so that the shaft 32 and the selector-cams mounted thereon are positively held in proper position at all times. The cam-rib is so shaped, as will be apparent from an inspection of Fig. 2, that the star-wheel 38 is rotated in a reverse direction when even the direction of rotation of the crank-shaft and the wheel 40 is reversed, and thus any alteration in the timed relation between the selector-cams and the other parts of the loom is prevented.

The cam from which the slide 18 and the actuator 17 are actuated is indicated at 43. This cam is secured to a disk 44, removably secured upon one end of the cam-shaft 45 outside of the side frame of the loom, the bolts 46, which secure the cam to the disk, passing through segmental slots in the disk, so that the cam can be adjusted angularly about the shaft. The cam engages at substantially diametrically opposite points two rolls 47 and 48, mounted upon a rod 49. This rod is pivotally connected at its upper end to the slide 18 and at its lower end to one end of a link 50, the other end of which is pivotally connected to a bracket secured to the loom-frame. The lower end of the rod 49 between the rolls 47 and 48 is also provided with a slot through which the cam-shaft 45 passes. The shape of the cam 43 is such that the distance between the two points of the cam in contact with the rolls 47 and 48 is constant, so that the rod 49 and the slide 18 and actuator 17 are positively actuated by the cam in both directions. When, therefore, a coupler-bar is engaged by the actuator, the heddle-frame connected with the coupler-bar is also actuated positively in both directions. During each revolution of the cam 43 the actuator 17 makes a complete reciprocation and is caused to dwell near the limit of its movement by a rest on the cam, the rest on the portion of the cam which is uppermost in Figs. 2 and 11 being that portion of the surface between the points 51 and 52. While this portion of the cam is passing the roll 47 or the roll 48, the shaft 32, upon which the selector-cams are mounted, is actuated, as will be apparent from an inspection of Fig. 2. When it is desired to vary the timed relation between the movements of the heddle-frames and the other parts of the loom—as, for instance, the timed relation between the movements of the heddle-frames and the beating-up movement of the lay—the cam 43 can be adjusted angularly about the shaft 45 and secured in its adjusted position by the bolts 46. If a wider variation is desired than can be obtained by an angular adjustment of the cam 43, the cam can be readily removed and a cam of a different shape substituted therefor.

It will be understood that the harness-motion illustrated in the drawings and above specifically described embodies the several features of my invention in their preferred form only and that except as defined in the claims my invention is not limited to the specific construction and arrangement of parts illustrated, but may be otherwise embodied without departing from the spirit thereof.

Having thus indicated the nature and scope of my invention and having specifically described the preferred form thereof, I claim as new and desire to secure by Letters Patent—

1. A harness-motion for looms having in combination a heddle-frame, a reciprocating actuator, connections between said actuator and heddle-frame comprising two coupler-bars connected to reciprocate in opposite directions, and means for connecting either of said coupler-bars to said actuator so as to be actuated thereby during the movement of the actuator in either direction.

2. A harness-motion for looms having in combination a heddle-frame, a reciprocating actuator, connections between said actuator and heddle-frame comprising two coupler-bars connected to reciprocate in opposite directions and extending on the same side of said actuator and coöperating projections on said bars for holding one bar disconnected from said actuator while the other bar is connected thereto.

3. A harness-motion for looms having in combination a heddle-frame, a reciprocating actuator, connections between said actuator and heddle-frame comprising two coupler-bars connected to reciprocate in opposite directions and provided with notches to engage said actuator so as to be actuated thereby during the movement of the actuator in either direction, a selector-cam acting on both of said coupler-bars, and means for holding one bar disconnected from said actuator while the other bar is connected thereto.

4. A harness-motion for looms having in combination a heddle-frame, a reciprocating actuator, connections between said actuator and heddle-frame comprising two coupler-bars connected to reciprocate in opposite directions and provided with notches to engage said actuator so as to be actuated thereby during the movement of the actuator in either direction.

5. A harness-motion for looms having in combination a heddle-frame, a reciprocating actuator, connections between said actuator and heddle-frame comprising two coupler-bars connected to reciprocate in opposite directions and provided with means for engaging said actuator so as to be actuated thereby during the movement of the actuator in either direction, a selector-cam acting on said coupler-bars and means for imparting a movement to said cam for each movement of the said actuator in either direction.

6. A harness-motion for looms having in combination a heddle-frame, connected bent levers, links connecting said levers and heddle-frame, a cam-lever acting on one of said bent levers, and a cam and suitable connections for actuating said cam-lever.

7. A harness-motion for looms having in combination a heddle-frame, a lever, suitable connections between said lever and heddle-frame, a cam-lever acting on said lever, an actuator, and two coupler-bars connected to said cam-lever on opposite sides of its pivot, each of said coupler-bars being provided with means for engaging said actuator.

8. A harness-motion for looms having in combination a heddle-frame, a cam and suitable connections for actuating said frame, a rotary support equilateral in cross-section, and a selector-cam acting on said connections provided with a corresponding equilateral opening to receive said support.

9. A harness-motion for looms having in combination a heddle-frame, a cam and suitable connections for actuating said frame, a shaft, a sleeve on said shaft equilateral in cross-section and a selector-cam acting on said connections provided with a corresponding equilateral opening to receive said sleeve.

10. A harness-motion for looms having in combination a heddle-frame, a cam and suitable connections for actuating said frame, a shaft, a selector-cam slidingly mounted thereon so as to be readily adjusted and replaced, said selector-cam acting on said connections, and mechanism for imparting a step-by-step movement of rotation to said shaft.

11. A harness-motion for looms having in combination a heddle-frame, a reciprocating actuator, connections between said actuator and heddle-frame comprising two coupler-bars connected to reciprocate in opposite directions and extending on the same side of the actuator, and means for connecting either of said coupler-bars to said actuator.

12. A harness-motion for looms having in combination a heddle-frame, a reciprocating actuator, connections between said actuator and heddle-frame comprising two coupler-bars connected to reciprocate in opposite directions and extending on the same side of the actuator, a cam-actuated follower engaging both coupler-bars and acting to hold the coupler-bars out of engagement with the actuator, and a spring-actuated follower for each of said coupler-bars acting to move the coupler-bars into engagement with said actuator.

13. A harness-motion for looms having in combination a heddle-frame, a cam and suitable connections for actuating said frame, a rotary support and an angularly-adjustable selector-cam acting on said connections mounted upon said support.

14. A harness-motion for looms having in combination a heddle-frame, a cam and suitable connections for actuating said frame, a rotary support, a selector-cam removably mounted thereon acting on said connections, and mechanism for imparting a step-by-step movement of rotation to said rotary support having provision for varying the extent of each step-by-step movement.

15. A harness-motion for looms having in combination a heddle-frame, a reciprocating actuator, and connections between said actuator and heddle-frame comprising coupler-bars provided with notches to engage said actuator, each notch having a contracted mouth.

16. A harness-motion for looms having, in combination, a heddle-frame; guides therefor; an actuating-cam therefor; a single actuator moved by said cam; intermediate connections coöperating with said actuator, connecting with the heddle-frame from above only, and arranged to actuate the heddle-frame positively in both directions, said connections comprising two oppositely-moving coupler-bars adapted to be separately coupled to said actuator; selecting mechanism acting upon said coupler-bars to control their coöperation with said actuator; and means for holding the heddle-frame when elevated.

17. A harness-motion for looms having, in combination, a heddle-frame; guides therefor; an actuating-cam therefor; a single actuator moved by said cam; intermediate connections coöperating with said actuator, connecting with the heddle-frame from above only, and arranged to actuate the heddle-frame positively in both directions; and means for holding the heddle-frame when elevated.

18. A harness-motion for looms having, in combination, a heddle-frame; guides therefor; an actuator; intermediate connections coöperating with said actuator, connecting with the heddle-frame from above only, and arranged to actuate the heddle-frame positively in both directions; and means for holding the heddle-frame when elevated.

19. A harness-motion for looms having, in combination, a heddle-frame; guides therefor; an actuating-cam therefor; a single actuator moved by said cams; and intermediate connections coöperating with said actuator, connecting with the heddle-frame from above only, and arranged to actuate the heddle-frame positively in both directions.

20. A harness-motion for looms having in combination a heddle-frame, a reciprocating actuator, connections between said actuator and heddle-frame comprising coupler-bars provided with notches to engage said actuator, a cam with rests thereon for reciprocating the actuator and causing it to dwell near the limit of its movement in each direction, and means for moving the coupler-bars into and out of engagement with the actuator during the dwells of the actuator.

21. A harness-motion for looms having, in combination, a heddle-frame, substantially vertical guides therefor, connected bent levers, links connecting said levers and the heddle-frame, and means acting upon one of said bent levers to move the heddle-frame positively in both directions said heddle-frame otherwise having no operating connection.

22. A harness-motion for looms having, in combination, a heddle-frame, substantially vertical guides therefor, connected bent levers, links connecting said levers and the heddle-frame, one of said bent levers having two separated arms, and means acting upon said separated arms in alternation to move said heddle-frame positively in both directions.

In witness whereof I have hereunto signed my name in the presence of two subscribing witnesses.

CHARLES F. ROPER.

Witnesses:
   GEORGE OTIS DRAPER,
   ERNEST W. WOOD.